March 18, 1969    N. C. GENEVAY    3,433,219
ROTARY ORTHOPTIC INSTRUMENT
Filed Sept. 8, 1966    Sheet 1 of 2
FIG. 1
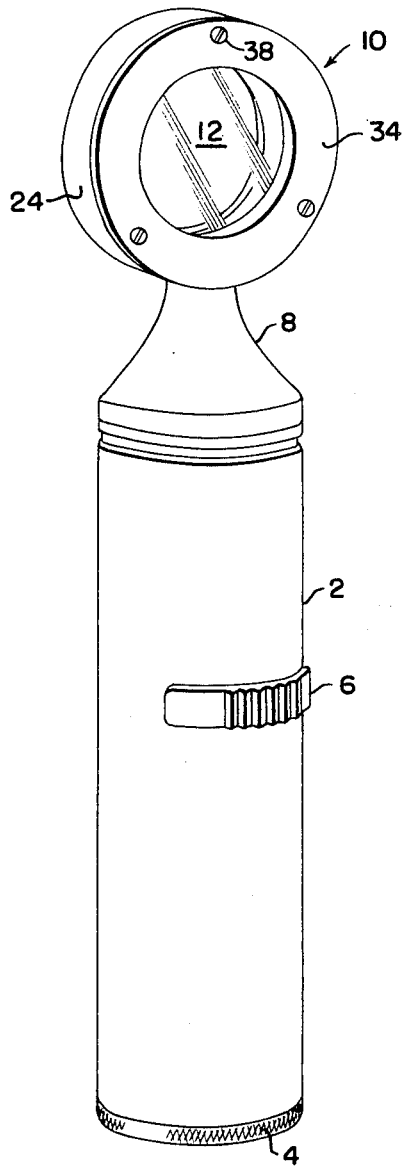
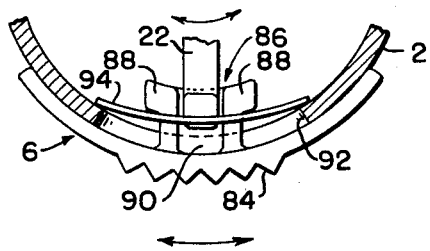
FIG. 4
INVENTOR.
NOEL C. GENEVAY
BY
Kenway, Jenney + Hildreth
ATTORNEYS

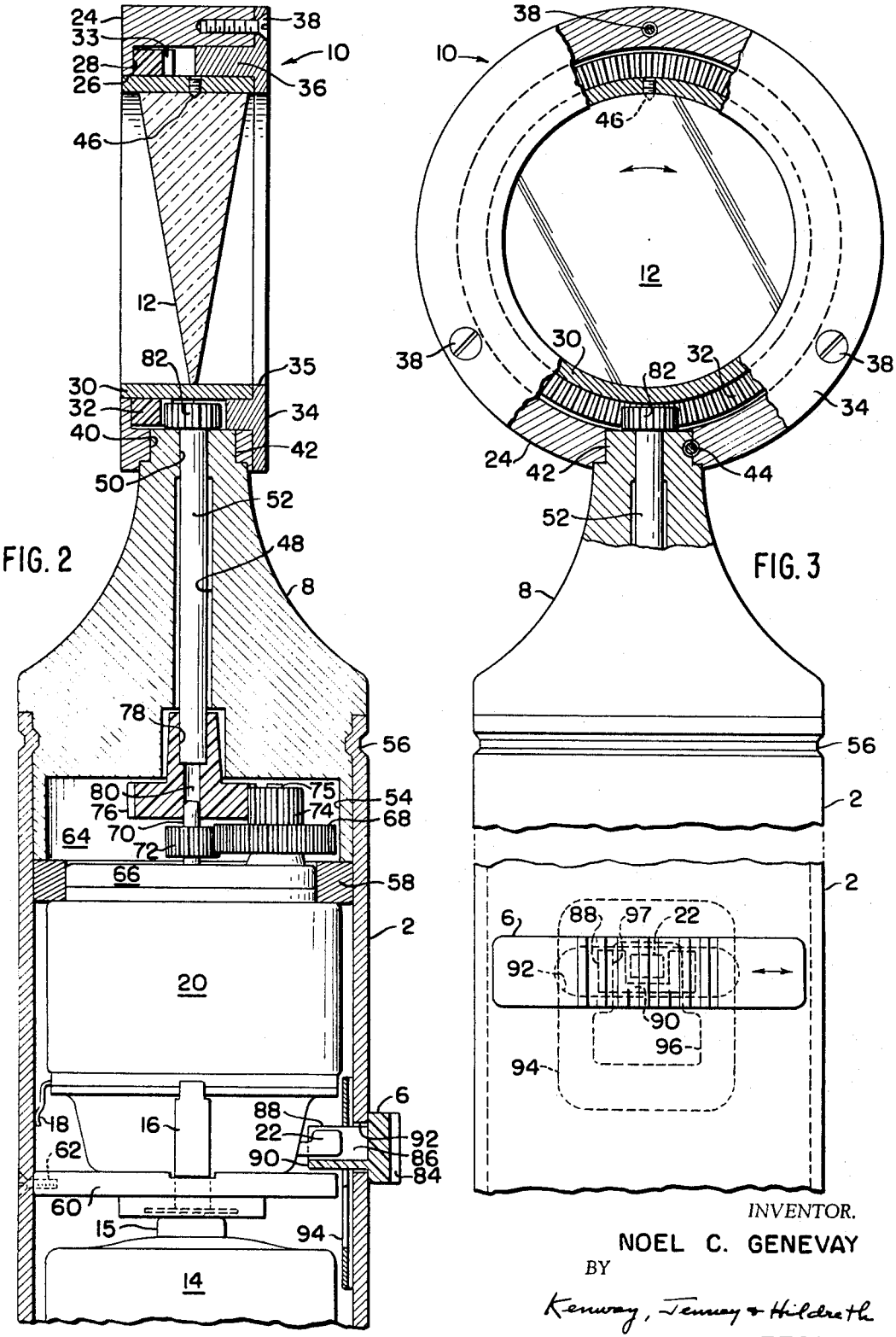

United States Patent Office 3,433,219
Patented Mar. 18, 1969

3,433,219
ROTARY ORTHOPTIC INSTRUMENT
Noel C. Genevay, 712 Common St.,
New Orleans, La. 70130
Filed Sept. 8, 1966, Ser. No. 578,025
U.S. Cl. 128—76.5                                  7 Claims
Int. Cl. A61h 5/00

This invention relates to orthoptic instruments, and in particular to a hand-held rotary Orthoptor for exercising and stimulating the para-macular zones in human retinas.

The present invention basically comprises a hand-held rotary Orthoptor comprising a casing in which is contained an electrical motor, and mounted at the end of the casing is a head containing a rotatable prism which can be sighted through by the user of the instrument. The prism is rotated by the motor under the control of the user by means of a switch, whereby the user can cause the prism to rotate either clockwise or counter-clockwise.

The instrument has as its primary function the improvement of motor-ocular function of the eyes for the relief of faulty binocular vision, and is a valuable aid toward the elimination of suppressions in human vision, and in problems emanating from mixed dominancies in reading problem cases. Examples of the latter are, for instance, the situations of righthandedness and left eye dominancy, and vice-versa, which are commonly experienced in school reading. The invention is specifically directed toward the creation of simultaneous consciousness of perception of both eyes. By the use of this invention, amblyopia can be helped visually up to the limits of its potential of visual response in the amblyopic eye, because of the strong intraocular stimulus induced by the rotating prism which causes simultaneous perceptions, that is, the seeing of two images at the same time.

The instrument develops this simultaneous perception by visually exercising the perceptive response of the cones in the para-macular or peripheral foveal regions in each retina. This is particularly valuable in patients who may have myoptic strabismus, and also in those situations where surgical operations have been performed in order to correct myoptic strabismus but the eyes need careful exercising thereafter. In particular, the instrument is helpful in the treatment of such forms of eye defects where the esotropia is deeply embedded.

Prior instruments have been used and perform some of the functions of this invention, but such instruments have been relatively inflexible in use. Either the prisms cannot be governed at the will of the patient under the instructions of the ophthalmologist; or the prisms have been mounted in rather elaborate machines, the latter resulting in the patient's having had to come to the ophthalmologist's office for periodic training. This invention can be used at home by the patient in following a prescribed schedule of eye exercises. Furthermore, in this invention, the instrument is hand-held by the patient, and the fact that the patient can, at will or under the direction of an ophthalmologist, cause rotation of the prism in either of two directions for varying periods of time; and the fact that the patient can transfer the use of the instrument readily from one eye to the next, or use two instruments simultaneously, one for each eye and each instrument being controllable independently of the other, enables the training physician to direct the patient into methods of use of the instrument which most rapidly produce the corrective results desired.

Prior apparatus in which rotating prisms have been used are well known, but such apparatus has been bulky, and not adapted to flexibility of use by the patient himself or by the patient acting under the directions of the ophthalmologist. Also, because of the design of the apparatus of this invention, it is possible to use the apparatus readily under conditions in which the patient either wears or does not wear his ordinary spectacles.

Therefore, among the several objects of the invention may be noted the following:

One object of the invention is the provision of a hand-held rotary Orthoptor useful in the training of eyes to correct defects in vision, the apparatus being readily adapted for use by persons of sufficient age to follow simple instructions.

Another object of the invention is the provision of an instrument of the aforesaid class, in which the handle thereof contains both an energizing motor, a source of electrical energy therefor, and a control switch, the combination in a hand-held device enabling the patient to have greater than usual flexibility in regards to using the instrument for its intended purpose.

Yet another object of the invention is the provision of apparatus of any of the above classes which is readily adapted for use by patients either when they are wearing their normal corrective spectacles, or without those spectacles, and which is so designed as to be easily held by hand by the patient in front of either eye at the distance most suitable for its use as an exerciser.

A further object of the invention is the provision of apparatus of the aforesaid classes, which is low in cost, is adapted for mass manufacture, and is simple to use and 'maintain.

Other objects and advantages will be in part obvious, and in part pointed out hereinafter.

The invention accordingly comprises the elements and combination of elements, features of construction, arrangements of parts, and manipulation of the apparatus all of which will be exemplified in the structures hereinafter set forth, and the scope of the application of which will be indicated in the appended claims.

Referring now to the accompanying drawings, in which is illustrated an embodiment of the invention.

FIG. 1 is a vertical view of the instrument of this invention, in approximately full size.

FIG. 2 is an enlarged sectional view of the upper portion of the FIG. 1 embodiment, given to show in greater detail the assembly and construction of the device;

FIG. 3 is another enlarged view of the FIG. 1 embodiment, showing certain portions sectionalized in order to illustrate more clearly the construction and arrangement of parts; and FIG. 4 is an enlarged plan view, partly in section, of a switching member of the embodiment, showing how the switching member is installed on the casing of the instrument.

Throughout the drawings, similar reference characters indicate corresponding parts. Also, throughout the drawings, dimensions of certain of the parts as shown in the drawings may have been modified and/or exaggerated for the purposes of clarity of illustration.

Turning now to FIG. 1, which illustrates a general view of the instrument, the instrument comprises a cylindrical body 2 made of metal such as aluminum, stainless steel or brass, the body terminating in an open end which is normally closed by a cap element 4, cap 4 being threaded to thread into or onto the end of the body 2 similar to a manner commonly used, for example, for capping flashlights to close one end thereof. The purpose of providing the open end is to be able to insert a battery into the casing 2 for the operation of the motor therein. A slidable switching element 6 is provided, in this instance the switch 6 being slidable in a direction around the casing 2 instead of lengthwise thereof.

The other end of the casing ends in a neck portion 8, the neck portion being provided in order to facilitate holding the rotating prism of the instrument close to the eye of the patient when in use. Mounted on the end of the neck 10 is the housing 8 for a rotating prism and which will be fully described below. Housing 10 is toroidal in shape, and thus forms an open aperture in which is mounted a prism 12, the latter being a plano-prism having a prism angle of 17° to 20°.

Referring now to FIG. 2, there is illustrated in section the upper portion of the instrument thus described. Also shown is the top portion of a battery 14 which has been inserted in the casing and is held therein by the end cap 4. Cap 4 is provided with a spring (not shown) which makes a connection with the bottom end of the battery in conventional manner, and the central electrode 15 of the battery makes connection with a central terminal 16 of a motor 22 to which is connected (through the motor commutator) one end of the rotor winding of the motor. The other terminal of the rotor winding makes connection through the commutator to a spring clip 18 which presses against the wall of the casing and thus to the other electrode of battery 14.

The motor 20 is a small motor using a wound rotor and a permanent magnet field such as in common use today, for example, in many hand-held electrical appliances such as toothbrushes, carving knives, and shoe buffers. Incorporated in the motor, as is well known in the art, is a double pole, double throw rotary switch having a projecting switch handle 22. The switch controls the motor so as to rotate in one direction as handle 22 is moved in one direction, and so as to rotate in the other direction if the handle is moved in an opposite direction. In the intermediate position of handle 22, the motor is disconnected. In view of the fact that these motors and their switching connections are very conventional and widely used today, no further description will be herein made of such a motor per se.

The housing 10 comprises an annulus 24 which is toroidal in shape, and has therethrough the aperture 26. The annulus is provided with an inwardly projecting flange 28 to provide a bearing surface for a rotatable barrel 30 now to be described.

An annular barrel 30 is provided of such outer diameter as to fit rotatably in the aperture 26. The length of the barrel 30 is the same as the length of the annulus. Mounted about the periphery of the barrel 30 is a ring gear 32, this gear being fastened to the barrel 30 either by cementing it in place or by screws. If desired, the ring gear and the barrel may be made integrally and the gear teeth 33 cut on the ring gear thereafter. The ring gear can be made by molding it out of synthetic plastic such as nylon, using a mold suitably formed to produce the correct gear tooth shape, and may be fastened to the barrel by suitable epoxy cements. As fastened, it will be noted that the teeth 33 of the gear point axially of the annulus 24. The backside of the ring gear serves as a bearing for the barrel against the flange 28, and the ring gear is so positioned that when the barrel and ring gear are inserted, the edge of the barrel and the back face of the annulus 24 are co-planar.

An annular retaining sleeve 34 is provided, having an outer diameter equal to that of the annulus 24, and an inner aperture 35 equal to that of the inner diameter of the barrel 30. Sleeve 34 is provided with projecting cylindrical boss 36 which has an inner diameter equal to the diameter of the barrel 30, and so sized that the barrel 30 rotates smoothly therein. Boss 36 has an outer diameter adapted to fit snugly within annulus 24. As shown, when the retaining sleeve 34 is put in place to cover the right-hand face (as viewed in FIG. 2) of the annulus 24, the boss 36 projects inwardly into the annulus 24 and thus serves as a bearing for the rim of barrel 30. Sleeve 34 is held in place by means of the set screws 38, or, if desired, the outer periphery of the outstanding annular boss 36 may be threaded, with a corresponding matching thread being cut on the inner periphery of the annulus 24. If this latter construction is adopted, then the sleeve may be screwed into place.

The bottom of the annulus 24 is provided with a radially-directed bore 40 to receive a reduced end portion 42 of the neck 8, a shoulder being provided as shown to enable the annulus 24 to be seated firmly and straightly on the neck 8. The preferred fit is a snug fit, and after the annulus 24 is put in place, then a set screw 44 is inserted in a threaded hole which is formed partially in the neck portion 42 and partially in the bore 40, thus locking the annulus 24 to the neck 8. Of course, if desired, instead of the simple snug fit shown, the end portion 42 may be threaded to match a correspondingly interiorly threaded bore 40, and thus the annulus 24 may be screwed on to the neck end with suitable means for locking it in place.

Mounted in the barrel 30 is the prism 12, the latter being cut from a plastic rod and having plano faces ground and polished thereon, the angular separation of the plano faces being in the range of 17° to 20°. As fashioned, the base of the prism and the top are curved to the same diameter as the diameter of the barrel 20 so as to fit nicely in the barrel, and the prism may then be fastened in the barrel by means of a single set screw 46, as shown, the latter being threaded into the wall of the barrel 30 and having its pointed end projecting into a suitable conical recess in the base of the prism, all as shown. Of course, if desired, the prism may be cemented in place. However, the mounting shown is the preferred one, since the prism may then be readily changed for one of different power, if desired.

The neck member 8 is preferably a member separate from the housing 2 and is provided with a bore 48 therethrough, one end of bore 48 ending in a reduced bearing portion 50 which rotatably receives the one end of the drive shaft 52, and the other end of bore 48 being enlarged to receive the hub of gear 76.

The lower end of neck 8 terminates in a skirt 54, the skirt being so dimensioned as to be a snug fit into the end of the casing 2. Once the neck is so fitted into the casing, then it may be fastened thereto either by crimping it therein as shown by bead 56, or the neck may be fastened to the casing by means of screws passing through the end of the casing and threading into the end of the neck 8.

A circular spacer ring 58 is provided properly to space the end of motor 20 from the outer end of the skirt 54. A retaining plate 60 is provided at the other end of the motor, the motor being held in its proper position in the casing by means of a screw 62 which threads through the casing wall into the retaining plate 60. As the motor is thus assembled, it will be noted that its switch lever 22 projects radially and its outer end is adjacent the inside wall of the casing 2.

The skirt 54 is of such length as to provide a recess 64 which is adapted to receive a gear reduction system for driving the shaft 52. The top of the motor is provided with a plate 66, the function of which is to support an idler wheel 68 on a shaft 75 fastened to plate 66. To the motor shaft 70 is fixed a pinion 72 which engages the idler pinion 68. Fastened to pinion 68 is a smaller pinion 74, and this latter pinion engages a large pinion 76 which is fastened to one end of the drive shaft 52.

In view of the method of assembly which is to be described below, if the shaft 52 and the pinion 76 are both of metal, then the construction is that the end of shaft 52 is made polygonal in cross-sectional shape, and the socket in pinion 76 is made the same and is so dimensioned that these parts fit together with a snug but smooth sliding fit. If, as is preferred, the shaft 52 is of metal and the pinion gear 76 is of a tough plastic such as nylon, then the socket 78 in the pinion 76 can be made a squeeze fit onto the end of the drive shaft 52, the fit being tight enough so that no slipping occurs even though both the end of the drive shaft and the socket may be cylindrical. However, if desired for additional security, then the end of the drive shaft 52 can be polygonal in cross-section with the socket 78 being similarly shaped.

Pinion 76 is also provided with a bore 80 which is adapted to receive the end of the motor shaft 70 with a sliding fit. When the motor is inserted in the casing with the drive shaft 52 and its pinion 76 already in place, the end of shaft 70 will enter into the bore 80, and thus the motor shaft itself serves as a bearing for one end of the drive shaft 52, the other end being supported in bearing 50.

At the other end of drive shaft 52, there is mounted a small spur gear 82 which is firmly fastened to the end of the drive shaft and whose teeth engage the teeth 33 of the ring gear 32.

It will thus be seen, from the above description and construction, that when the motor rotates, it drives the barrel 30 through the reduction gear system comprising gears 72, 68, 74 and 76, drive shaft 52, gear 82 and ring gear 32.

The number of teeth on ring gear 32, pinion 82, pinion 76 idler pinions 74 and 68, and drive pinion 72 are such that the barrel and prism are rotated at a rate of about 60 r.p.m. Obviously, it is within the skill of the art to determine the precise number of teeth for each of the individual gear elements to get the above speed for a given motor speed. Thus, no detailed description of this gear train will be further given here.

Referring now to FIGS. 1 and 4, the switch 6 comprises a molded plastic member having a knurled outer surface 84 to facilitate manipulation thereof, the switch member 6 being curved so as to lie snugly against the outer surface of the casing 2. Molded as an integral part of member 6 is a projecting cup-shaped clevis 86 having side walls 88—88 and a bottom 90. Casing 2 is provided with a peripheral slot 92 adapted to receive the clevis 86 therethrough, the outer portion of the switch member overlying the slot 92 in all positions of the switch. Clevis 86 is adapted to receive therein the end of the switch arm 22 of the motor between walls 88. A rectangularly-shaped locking plate 94 of spring sheet metal is provided, this plate having an aperture 96 centrally disposed therein, the aperture being enlarged, as shown in dotted lines in FIG. 3, at its bottom portion to the extent that it may be slid over the clevis arm 88. The upper portion 98 of the aperture 96 is narrower than the total width of the clevis 86, so that if the plate is forcibly slid down to bring the portion 98 over the clevis, the edges of the aperture will bite therein to hold the plate in place and thus slidably clamp the switch member 6 to the casing.

The assembly of the device is as follows: the prism bearing annulus 24 is first assembled on the end of neck 8, as has been already described above. The shaft 52 with its attached pinion 82 is then dropped down through the bearing 50, and the pinion gear 76 is then press fitted onto the end of shaft 52 as has been described above. The barrel 30 with its contained prism 12 is then slipped into place. (It will be found that the engagement of the teeth of pinion 82 and the teeth 33 of the ring gear 28 is sufficiently loose so that this assembly of barrel and prism and ring gear can thus be slid into place.) Thereafter the retaining plate 34 is put in place and is held by means of the screws 38.

The end plates 60 and 66 are placed on the motor, and the spacing washer 68 is placed on the top of the motor. Thereafter, the idler pinion assembly 68–74 is placed on its idler shaft 75 so as to be in engagement with the drive pinion 72. The retaining or locking plate 94 is then placed loosely over the switch member 22 with the bottom portion of its aperture 96 oriented downwardly as viewed in the drawings. This entire assembly is then moved upwardly into the casing 2 until the pinion 74 engages the pinion 76 and the spacer 58 comes in engagement with the inner end of the skirt 54. The motor is rotated bodily until the switch lever 22 points to the peripheral slot 92. In this position, the set screw 62 is screwed into plate 60 to fasten the entire motor assembly in position in casing 2.

The switch member 6 is now inserted in the slot 86 so as to have the clevis 88 envelop the end of the switch arm 22. Lock plate 94 is then moved laterally over the inwardly projecting stud 88 and pulled downwardly (as viewed in the drawings). As it does, the inner edges of the narrow portion 98 of the plate aperture engage the walls of the clevis 88. In view of the fact that the material of the retaining plate 94 is relatively thin, and the fact that the switch member 6 is made of molded plastic such as nylon, the edges of the aperture 98 will dig into the walls of the clevis 88, and thus hold the plate firmly in place.

To operate the instrument, a battery 14 is inserted in place so that its central electrode comes in contact with the suitably provided central terminal of the motor. The closure cap 4 has the usual spring therein which comes in contact with the casing electrode of battery 14, and thus the circuit to the other end of the motor winding is completed through the casing itself and the spring terminal 18. As indicated above, the motor is conventional, and thus contains a commutator which enables the motor to operate in one direction depending on which way the winding of the motor is energized. Rotation of the switch 2 in one direction will cause the motor to rotate in one direction and thus drive the prism 12 in a given direction, and movement of the switch 6 into its opposite position will connect the armature winding of the motor to cause a reverse rotation thereof, thus moving the prism in the opposite direction. As has been indicated above, these small D.C. motors are conventional in operation, and in most cases, a central position will be found of the switch element 22 in which the motor is at rest.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A rotary Orthoptor adapted to be hand-held comprising:
   an elongated tubular casing openable at one end and including a detachable cap for closing said end, the other end of the casing terminating in a neck having a bore therethrough longitudinal of said casing;
   an annulus mounted at the outer end of said neck with its axis transverse to the longitudinal axis of the casing, the wall of said annulus being pierced with a hole therethrough coaxial with said bore;
   a prism-holding cylindrical barrel rotatably mounted within the annulus with its axis coaxial with the axis of the annulus;
   a circular gear on the outer rim of the barrel for rotating the latter when the gear is rotated;
   a prism fastened in the barrel for rotation therewith;
   an electrical motor fixed in the casing with its shaft longitudinally oriented therewithin;
   a drive shaft rotatably mounted in said bore and having inner and outer ends, the inner end being adjacent the motor rotor shaft and the outer end protruding into said annulus to be adjacent said circular gear;

drive means coupling said rotor shaft to said inner end; a gear fixed on said outer end and engaging said circular gear; and control means for starting and stopping said motor, the latter, when energized, causing said prism to rotate.

2. The Orthoptor of claim 1 in which said motor is mounted in the portion of the casing adjacent said other end, and the remaining portion of the casing is adapted to receive therein an electrical battery for energizing said motor.

3. The Orthoptor of claim 1 in which one face of the annulus is provided with a radially extending flange, the flange forming a shoulder in conjunction with the inner periphery of the annulus and constituting a thrust bearing for said barrel and circular gear.

4. The Orthoptor of claim 3 including an annular member detachably fastened to the annulus, the inner rim of said plate radially overhanging the rim of the barrel thereby to hold the barrel, in conjunction with said flange, against substantial end play.

5. The Orthoptor of claim 1 in which the prism has a prismatic power within the range of 17 to 20 diopters, and the prism is mounted in said barrel with at least one of its faces at an angle to the axis of rotation of the barrel.

6. The Orthoptor of claim 1 in which the direction of rotation of said motor is reversible, and said control means when in one position operates the motor in one direction, and when in another position operates the motor in the reverse direction.

7. The Orthoptor of claim 1 in which said circular gear is a ring gear mounted on said barrel with its teeth lying in a plane perpendicular to the axis of rotation of the barrel, and said gear on said outer end of the drive shaft is a spur gear having its teeth in engagement with the teeth of the ring gear.

References Cited

UNITED STATES PATENTS

| | | | |
|---|---|---|---|
| 1,566,652 | 12/1925 | Clement | 351—9 |
| 1,769,295 | 7/1930 | Kennebeck | 128—76.5 |
| 1,949,022 | 2/1934 | Mandaville | 128—76.5 |

RICHARD A. GAUDET, *Primary Examiner.*

JOHN YASKO, *Assistant Examiner.*

U.S. Cl. X.R.

350—287; 351—2